(12) United States Patent
Jenny

(10) Patent No.: US 9,948,164 B2
(45) Date of Patent: Apr. 17, 2018

(54) LINEAR MOTOR HAVING OPTIMIZED POWER

(71) Applicant: JENNY SCIENCE AG, Rain (CH)

(72) Inventor: Alois Jenny, Rain (CH)

(73) Assignee: JENNY SCIENCE AG, Rain (CH)

( * ) Notice: Subject to any disclaimer, the term of this patent is extended or adjusted under 35 U.S.C. 154(b) by 463 days.

(21) Appl. No.: 14/564,373

(22) Filed: Dec. 9, 2014

(65) Prior Publication Data
US 2015/0162807 A1    Jun. 11, 2015

(30) Foreign Application Priority Data
Dec. 9, 2013    (DE) .......................... 10 2013 019 958

(51) Int. Cl.
*H02K 11/00* (2016.01)
*H02K 41/02* (2006.01)
*H02K 41/03* (2006.01)
*H02K 11/22* (2016.01)

(52) U.S. Cl.
CPC ......... *H02K 11/0026* (2013.01); *H02K 11/22* (2016.01); *H02K 41/02* (2013.01); *H02K 41/031* (2013.01)

(58) Field of Classification Search
CPC .... H02K 11/0026; H02K 11/22; H02K 41/02; H02K 41/031
USPC ........ 310/12.01, 12.19, 12.22, 12.33, 13, 14
See application file for complete search history.

(56) References Cited

U.S. PATENT DOCUMENTS

| 5,357,158 | A  | * | 10/1994 | Takei    | H02K 41/031 310/12.19 |
| 5,648,691 | A  | * | 7/1997  | Takei    | H02K 41/031 310/12.01 |
| 5,825,104 | A  | * | 10/1998 | Kondo    | H02K 41/03 310/12.04  |
| 5,838,079 | A  | * | 11/1998 | Morohashi| H02K 41/03 310/12.24  |
| 6,441,515 | B1 | * | 8/2002  | Shimura  | H02K 11/22 310/12.04  |
| 7,745,963 | B2 | * | 6/2010  | Jenny    | H02K 41/02 310/12.01  |
| 2001/0048249 | A1 |   | 12/2001 | Tsuboi et al. |              |
| 2001/0054851 | A1 | * | 12/2001 | Tsuboi   | H02K 41/031 310/12.19 |
| 2005/0258689 | A1 |   | 11/2005 | Kitade   |                       |

FOREIGN PATENT DOCUMENTS

EP    1732197 A2    12/2006

\* cited by examiner

*Primary Examiner* — Bernard Rojas
*Assistant Examiner* — Ahmed Elnakib
(74) *Attorney, Agent, or Firm* — Browdy and Neimark, PLLC

(57) ABSTRACT

Linear motor having optimized power, including a U-shaped profiled stator housing, which forms an inner installation space for receiving a winding packet consisting of multiple coils. The installation space is delimited on the cover side by a carriage driven so it is longitudinally displaceable by magnetic force on the stator housing, on which carriage a length scale is fastened, opposite to which a position sensor is arranged in the stator housing. The installation area for the arrangement of the winding packet in the stator housing is uninfluenced by the position sensor also arranged in the stator housing.

8 Claims, 10 Drawing Sheets

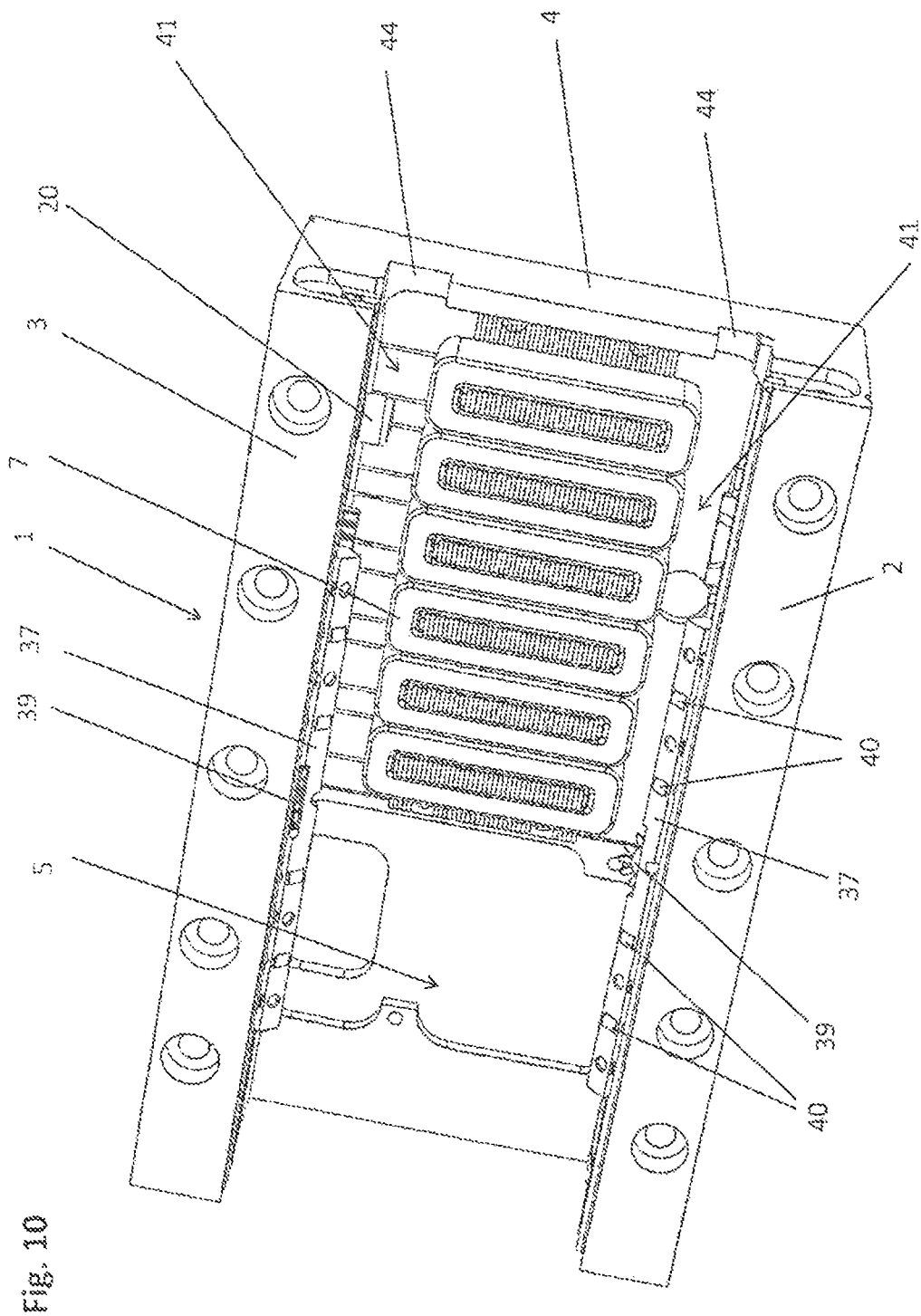

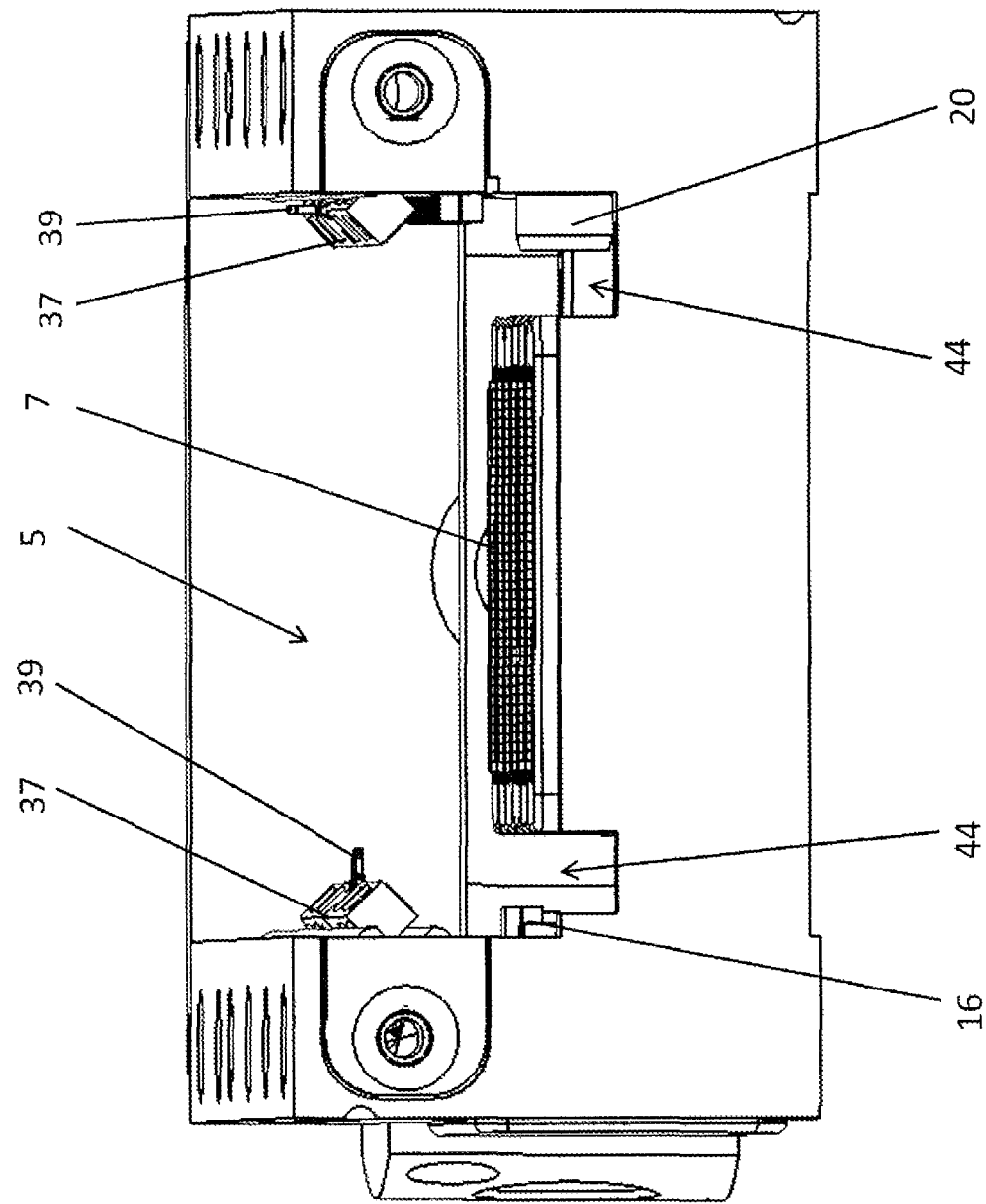

LINEAR MOTOR HAVING OPTIMIZED POWER

FIELD

The invention relates to a linear motor having optimized power.

BACKGROUND

The invention is directed to improvements in the prior art which is known from the separate document EP 1 732 197 A2.

The known linear motor consists of a U-shaped profiled stator housing, which forms an inner installation space for receiving a winding packet consisting of multiple coils, wherein the installation space is delimited on the cover side by a longitudinally-displaceable carriage driven on the stator housing, on which a length scale is fastened, which a position sensor is arranged opposite to in the stator housing.

The known linear motor is distinguished by an integrated longitudinal guide for the carriage. For the longitudinal guide of the approximately plate-shaped carriage, longitudinal grooves are implemented on the carriage side walls, in which one half of a roller arrangement engages, the other half of which engages in slide rails arranged on the opposite side of the stator housing in longitudinal grooves.

Such a roller arrangement has proven itself to a large extent. Because the roller arrangement is integrated in the interior of the stator housing and engages in the side walls of the approximately plate-shaped carriage, small structural dimensions therefore result of the linear motor, which operates at high power.

The compact construction of the linear motor according to EP 1 732 197 A2 is distinguished in that the stator housing is implemented approximately U-shaped in section and forms an inner installation chamber, which extends over the entire longitudinal extension of the stator housing. The U-shaped installation chamber is covered by an approximately plate-shaped carriage, which is driven so it is longitudinally displaceable, and on the underside of which a carriage-side receptacle chamber is arranged for receiving the permanent magnets.

It is characteristic for the known linear motor that a position sensor for scanning a carriage-side length scale is arranged in the installation chamber of the U-shaped profiled stator housing. The position sensor is accordingly arranged fixed in place in the installation chamber of the stator housing laterally adjacent to the winding packet, and the length scale, which is scanned in a contactless manner by the position sensor, is arranged on the underside adjacent to the permanent magnets in the cover region of the plate-shaped carriage.

Due to the necessarily adjacent arrangement of the winding packet arranged in the stator housing and the position sensor arranged adjacent thereto, however, the disadvantage existed that the usable installation area for the winding packet was thus restricted, because the position sensor arranged in the interior of the stator housing obstructed a lateral extension of the winding packet.

For this reason, the dimensioning of the winding packet could not be enlarged optimally, because it had to be implemented as relatively narrow due to the lateral delimitation by the position sensor arranged there.

The drive power of the known linear motor was therefore not optimal, because the installation space could not be utilized optimally for the winding packet.

The known linear motor has, as a dimensioning example, a stator housing having a width of 64 mm and a height of 25 mm with a variable length—depending on the type—in the range of approximately 44 to 272 mm.

For the mentioned reason, in the installation space additionally occupied by the position sensor, in each case only one winding packet having dimensions of approximately 18 mm×40 mm, in relation to six installed coils, can be installed, which restricted the power and therefore also the performance of the known linear motor.

SUMMARY

The invention is therefore based on the object of refining a linear motor according to EP 1 732 197 A2 so that the linear motor operates with optimized power.

To achieve the stated object, a linear motor is provided consisting of a U-shaped profiled stator housing, which forms an inner installation space for receiving a winding packet consisting of multiple coils, and the installation space is delimited on the cover side by a carriage driven so it is longitudinally displaceable by magnetic force on the stator housing, on which a length scale is fastened, opposite to which a position sensor is arranged in the stator housing. The installation area for the arrangement of the winding packet in the stator housing is uninfluenced by the position sensor also arranged in the stator housing.

It is essential for the installation area for the arrangement of the winding packet to be uninfluenced by the position sensor arranged in the stator housing. This is preferably achieved in that the position sensor is arranged in a recess of the stator housing outside the installation area for the winding packet.

The essential feature of the invention is accordingly that the position sensor arranged on the stator side in the stator housing is now arranged in a recess of the stator housing outside the installation area for the winding packet, and is oriented with its measurement surface toward a length scale arranged on the lateral surface of the carriage.

With this technical teaching, the advantage results in that, according to the invention, the position sensor no longer displaces or blocks the installation space in the stator housing for receiving the winding packet, but rather is removed from this installation space. The area of the installation space can therefore be used for an enlarged winding packet. The power of the linear motor is therefore decisively improved.

There are various possibilities in the arrangement of the position sensor, which is removed from the stator-side installation space, which are each claimed as essential to the invention per se or in combination with one another.

In a first embodiment of the invention, it is provided that a recess incorporated from the outside is provided in the lateral web of the stator housing, in which the position sensor is installed, which looks through an associated borehole or recess into the interior of the stator housing, and is oriented therein on the length scale arranged on the carriage side.

In a second embodiment of the invention, it is provided that the recess for receiving the position sensor is arranged in the lateral web of the stator housing, but is open from the inside, so that a passage to the outside is not provided in this type of the embodiment.

A third embodiment of the invention provides that the recess for receiving the position sensor is arranged either extending from the bottom surface from the outside to the inside in the bottom web of the stator housing, or a pocket hole or pocket recess open on one side is provided in the bottom web of the stator housing from the inner side (i.e., from the direction of the installation space), in which the position sensor is inserted.

With the removal of the position sensor—and its relatively bulky housing—from the installation space in the interior of the stator housing, the advantage now results that the interior of the stator housing can be used for the installation of a larger winding packet.

In relation to the linear motor described in the introduction to the description, the size of the winding packet can be enlarged to 25×48 mm, wherein this relates to six coils lying adjacent to one another with air gaps lying in between.

Such a winding packet preferably has a height of 10.8 mm and therefore achieves a nominal propulsion force of the linear motor of 20 N, which is achieved without additional cooling.

In the above-discussed linear motor, with equal dimensions of the stator housing, only a smaller winding packet was to be housed in the installation space and the linear motor therefore only still had a nominal force of approximately 10 N.

The advantage of the invention results therefrom, which provides that the position sensor is removed from the installation space of the stator housing and is offset to locations in the stator housing where it (the position sensor) no longer impairs the installation of a winding packet. The area which becomes free in the stator housing can therefore be used for an enlarged winding packet.

In a preferred embodiment of the invention, it is provided that the carriage is also implemented as U-shaped in profile, i.e., in a first preferred embodiment it consists of a base leg with two lateral legs attached thereon.

In this embodiment, it is provided that the roller arrangement is attached in the upper region of the two lateral legs and underneath this, in the region of the respective lateral leg which still remains free, and which is located below the roller arrangement in the vertical direction, the length scale is housed.

This means that the invention presumes that the carriage is implemented as approximately U-shaped in profile in a preferred embodiment, and the length scale associated with the position sensor is arranged in the region of one lateral leg.

There are various possibilities in this case. In a first embodiment, it can be provided that the length scale is arranged on the lateral surface of one lateral leg, is fastened below the roller arrangement, and the position sensor belonging thereto is arranged in the web of the stator housing.

In a second embodiment, it can be provided that the position sensor is arranged in the bottom region of the bottom web of the stator housing, engages through the bottom web, and accesses the end face of the one lateral leg of the U-profile of the carriage, where the length scale is arranged.

In addition to a horizontal arrangement of the position sensor and an associated vertical alignment of the length scale, it is claimed in the second embodiment that the position sensor is vertically oriented with its longitudinal axis and operates toward a horizontal length scale arranged on the lower end wall of the lateral leg.

In this exemplary embodiment, it is preferable if the carriage as a whole is implemented symmetrically as a U-profile, which means that the opposing lateral leg of the U-profile is also implemented identically to the other lateral leg. However, the invention is not restricted thereto. The lateral legs can also be implemented differently. It is only essential that in each case the roller arrangement is arranged in the lateral legs or above the lateral legs, and further functional parts are arranged below the roller arrangement in the region of one or both lateral legs, for example, in the above-described exemplary embodiment, the arrangement of the length scale.

However, if two symmetrical lateral legs are used, it is preferable if one lateral leg is used for fastening the length scale and the opposing lateral leg is implemented for the arrangement of a stop surface, in which a stop bolt arranged on the stator side engages, which forms the delimitation of the displacement of the carriage in the stator housing.

The invention is not restricted thereto. It can also be provided that the stop bolt provided for the stop delimitation of the longitudinal displacement of the carriage is also arranged on the side of the lateral leg which is associated with the position sensor.

This has the result that the lateral legs of the carriage do not necessarily have to be parallel and present simultaneously.

In another embodiment, it can be provided that one lateral leg is omitted and only a single lateral leg is still provided, which both receives the length scale for the position sensor arranged on the stator side and also receives the stop groove for the bolt arranged on the stator side.

In this case, the profile of the carriage is then approximately L-shaped.

In a third embodiment of the invention, it is provided that the profile of the carriage is rectangular, i.e., it is filled out to form a rectangle which is closed in profile and an installation space is only provided in the middle region of the rectangle, in which the permanent magnet arrangement is installed, which can be covered on the bottom by a cover plate.

Moreover, the invention is not restricted to the roller arrangement being provided in the upper region of the carriage on the side wall and the arrangement having the length scale and the position sensor arranged on the stator side being provided vertically underneath.

In another embodiment, it is provided that the length scale and the position sensor arranged opposite thereto on the stator side are located in the upper region of the stator housing, and therefore also in the upper region of the carriage, and the roller arrangement is located vertically underneath.

The invention subject matter of the present invention not only results from the subject matter of the individual patent claims, but rather also from the combination of the individual patent claims with one another.

All specifications and features disclosed in the documents, including the abstract, in particular the spatial implementation illustrated in the drawings, are claimed as essential to the invention, insofar as they are novel over the prior art individually or in combination.

BRIEF DESCRIPTION OF THE DRAWINGS

The invention will be explained in greater detail hereafter on the basis of drawings which illustrate multiple embodiments. Further features essential to the invention and advantages of the invention are disclosed in this case in the drawings and the description thereof.

In the figures:

FIG. 10: shows a top view of the stator housing.

FIG. 11: shows a frontal view of the stator housing.

DETAILED DESCRIPTION

Figure 1:
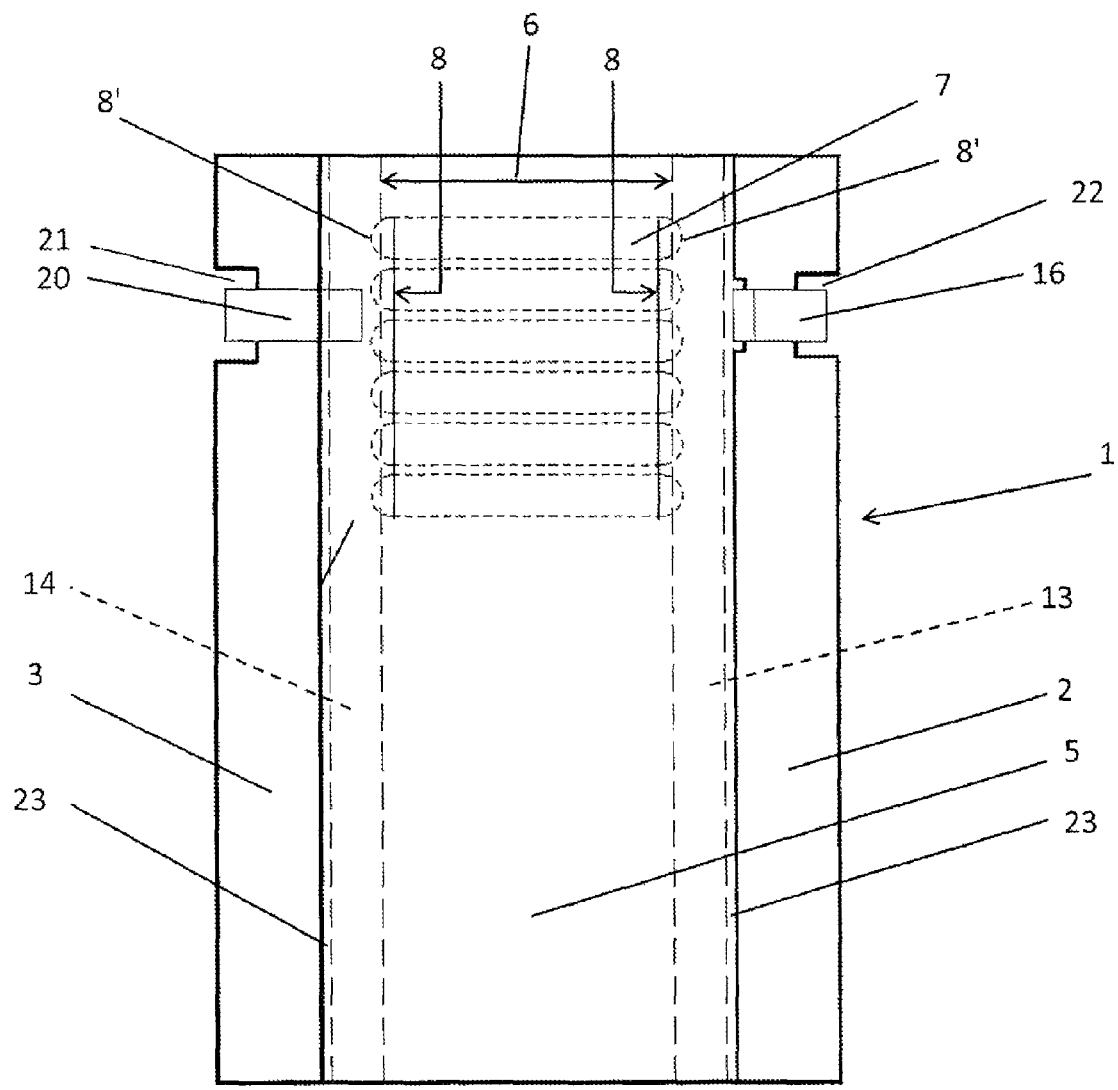
FIG. 1: shows a schematic illustration of the top view of a stator housing having carriage partially shown.

A stator housing 1 is schematically illustrated in FIG. 1, which forms an installation space 5 in a top view. The stator housing 1 is implemented as approximately U-profiled according to FIG. 2 and has two webs 2, 3, which are parallel to one another and of approximately equal size, and which are connected material-integrally to a bottom web 4 and thus form a continuous integral U-profile.

The installation space 5 is defined in the interior of the U-profile, which is provided for the installation of a winding packet 7.

Figure 2:
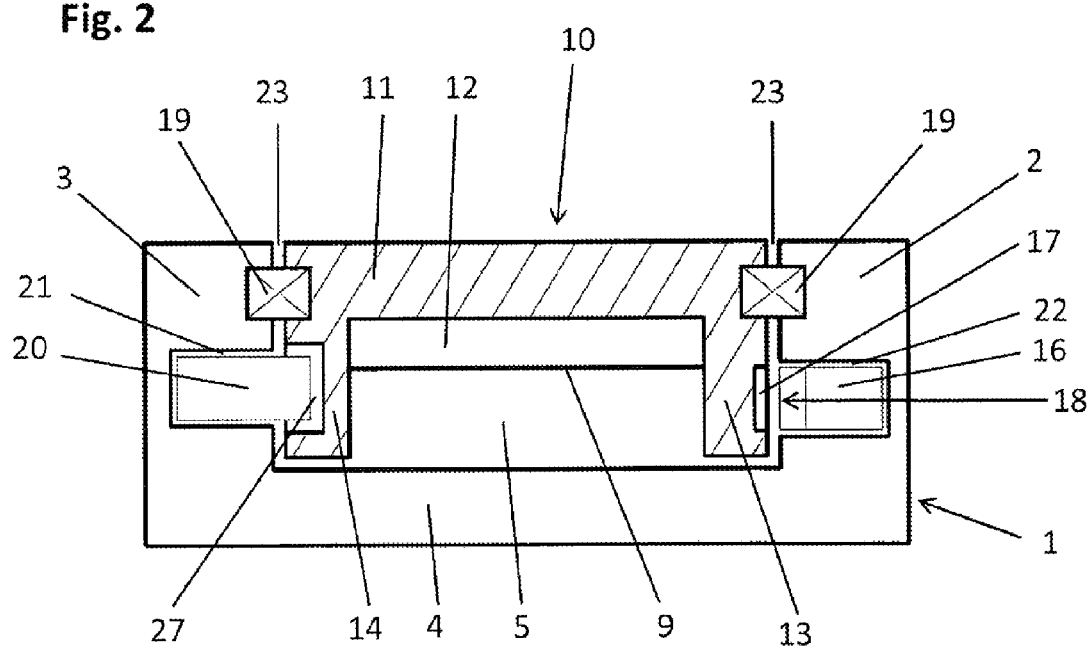
FIG. 2: shows a schematic section through a stator housing having inserted carriage according to a first embodiment of the invention.

It can be seen from FIG. 2 that the carriage 10 engaging in the stator housing 1 is also implemented as approximately U-shaped in cross section and consists of a base leg 11, which is connected material-integrally to two lateral legs 13, 14, which adjoin symmetrically thereon and are parallel to one another.

FIG. 1 schematically shows that the two lateral legs 13, 14 of the carriage 10 engage in the installation space 5 and therefore also in principle delimit the installation space in its width 6.

In the first embodiment shown, the respective lateral edge 8 of the winding packet 7 therefore has a distance to the inner side or inner delimitation of the respective lateral leg 13, 14 of the carriage 10.

However, the invention is not restricted thereto. The lateral edges 8 of the winding packet 7 can also extend under the lateral legs 13, 14 of the carriage 10 and therefore fill up the installation space 5 still better in its width 6.

This is schematically illustrated with the dashed lines 8', where it is shown that the lateral edges 8' can also extend under the lateral legs 13, 14 of the carriage 10.

It is essential that the width 6 of the installation space 5 is utilized optimally for the entire width of the winding packet 7, which differentiates the invention from the prior art.

Specifically, in the prior art the winding packet 7 had to be implemented as smaller and narrower, because the installation space for a position sensor 16 also had to be provided in addition to the winding packet 7.

The invention engages here, and it is shown according to FIGS. 1 and 2 that now a recess 22 is provided in a web 2 of the stator housing, in which a position sensor 16 is inserted, which therefore looks inward through the recess 22 in the web 2 and is oriented on the length scale 17 arranged on the lateral edge of the right lateral leg 13 of the carriage.

The measurement direction corresponds to the arrow direction 18 shown.

It is therefore possible for the first time to remove the position sensor 16 from the installation space 5 in the interior of the stator housing 1 and now displace it into the region of the one web 2 or 3 of the stator housing 1.

Furthermore, it is essential that now an optimized space for the attachment of the length scale 17 is achieved in that the vertical length of the lateral legs 13, 14 is lengthened downward, to attach the length scale 17, which extends in the longitudinal direction, in this lengthened region. This is shown in FIG. 2.

Figure 8:
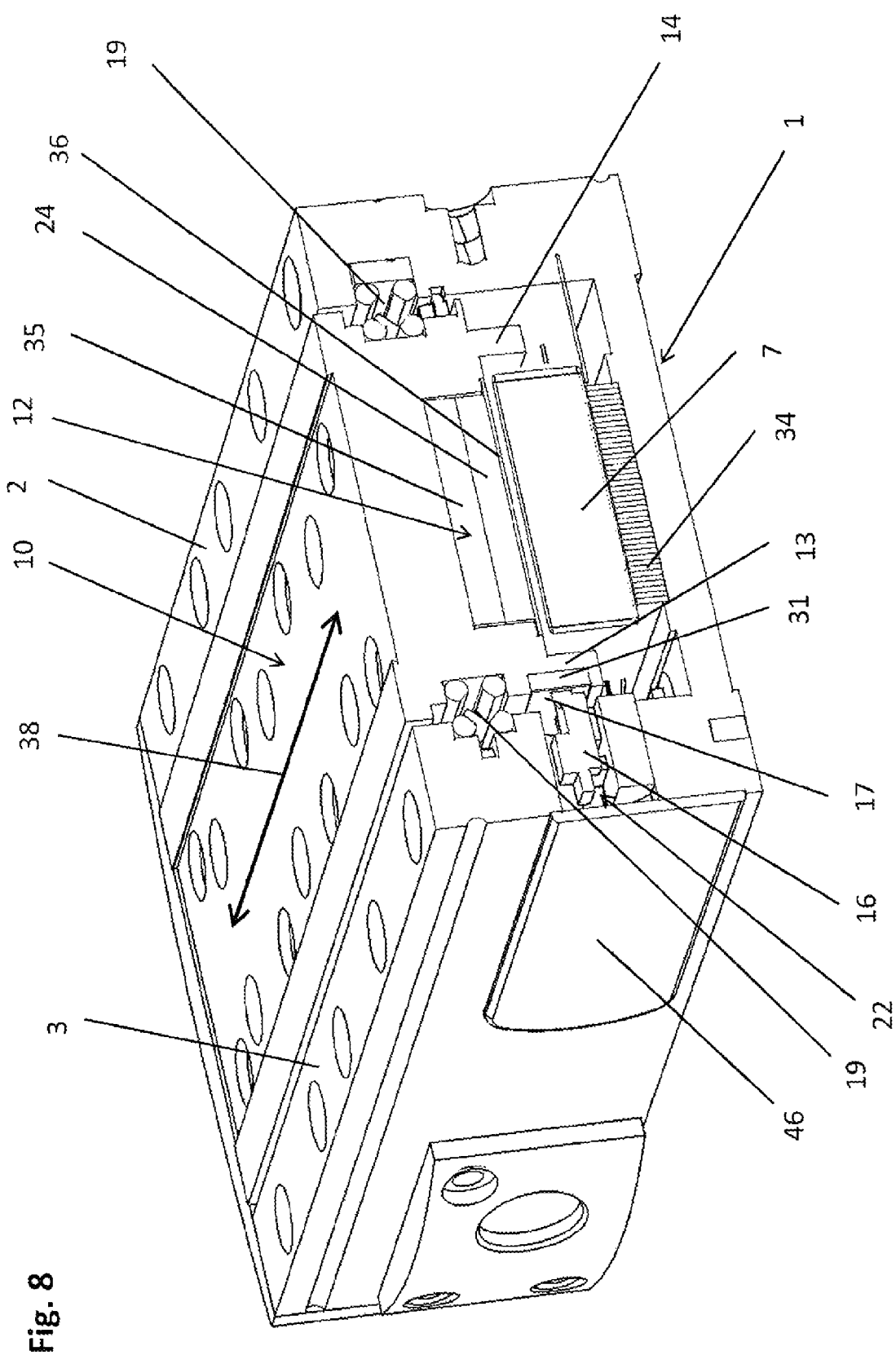
FIG. 8: shows further details of FIG. 7.

FIG. 2 also shows that the opposing lateral leg 14 can be used for a stop delimitation of the displacement movement of the carriage in the arrow directions 38 (see FIG. 8).

For this purpose, a recess 21 is arranged in the side wall, i.e., in the region of the web 3 of the U-shaped profiled stator housing 1, in which a stop bolt 20 engages, which engages with its front end in an associated longitudinal groove 27 on the side wall of the carriage 10, i.e., in the region of the lateral leg 14.

The longitudinal displacement of the carriage 10 in the arrow direction 38 is accordingly limited by a stator-housing-side stop bolt 20, which is installed in the web region 3 in the horizontal direction. This can be inferred from FIGS. 1 and 2. It is therefore now possible to also remove the stop bolt 20 from the installation space 5 and therefore enlarge the installation volume in the installation space 5, to thus be able to install a larger winding packet 7.

In the prior art, the stop bolt 20 was also arranged in the installation space, which restricted the installation volume of the winding packet 7.

It is also preferable here if the recess 21 for receiving the stop bolt 20 is provided below the roller arrangement 19, although the invention is not restricted thereto.

It is also noted that longitudinal slots 23, which each extend in the longitudinal direction, result between the inner side of the webs 2, 3 of the stator housing 1 and the associated lateral legs 13, 14 of the carriage 10.

The respective roller arrangement 19 therefore bridges the longitudinal slots 23 and forms a stable roller arrangement for the longitudinal guiding of the carriage 10 in the stator housing 1.

Figure 3:
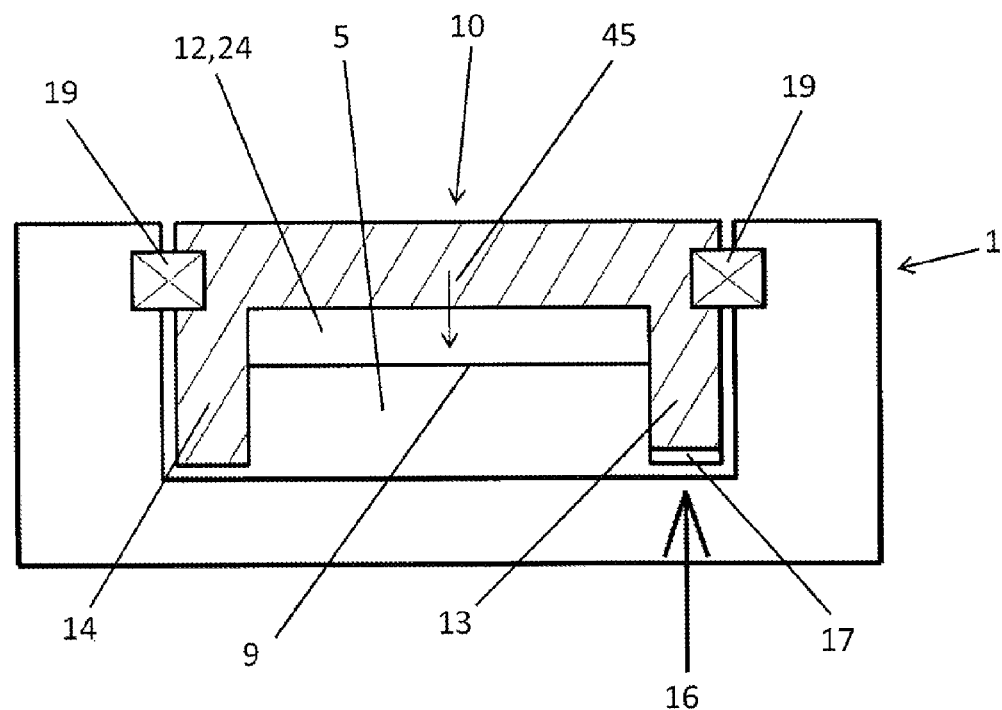
FIG. 3: shows a second embodiment altered in relation to FIG. 2.

FIG. 3 shows that the installation space 12 for the installation of permanent magnets 24 is provided below the base leg 11 of the carriage 10. The installation space is variable in broad limits. It can only be applied to a part of the interior between the lateral legs 13, 14; however, it can also be displaced downward in the arrow direction 45, so that the entire installation space in the clearance width of the lateral legs 13, 14 down to the lower edge 9 can be used. The lateral legs 13, 14 can also be present in this case, although the profile resulting therefrom more approximates the profile of a carriage according to FIG. 5.

FIG. 3 also shows as an alteration in relation to FIGS. 1 and 2 that it is also possible to fasten the length scale 17 on the lower end edge of the one lateral leg 13, and to arrange the position sensor 16 in a recess in the region of the bottom web 4 of the stator housing 1.

Such an installation arrangement can moreover also be performed on the opposing side on the lateral leg 14, wherein then a stop bolt 20 is installed in the region of the bottom web 4 and engages in an associated groove on the end side of the lateral leg 14.

Figure 4:
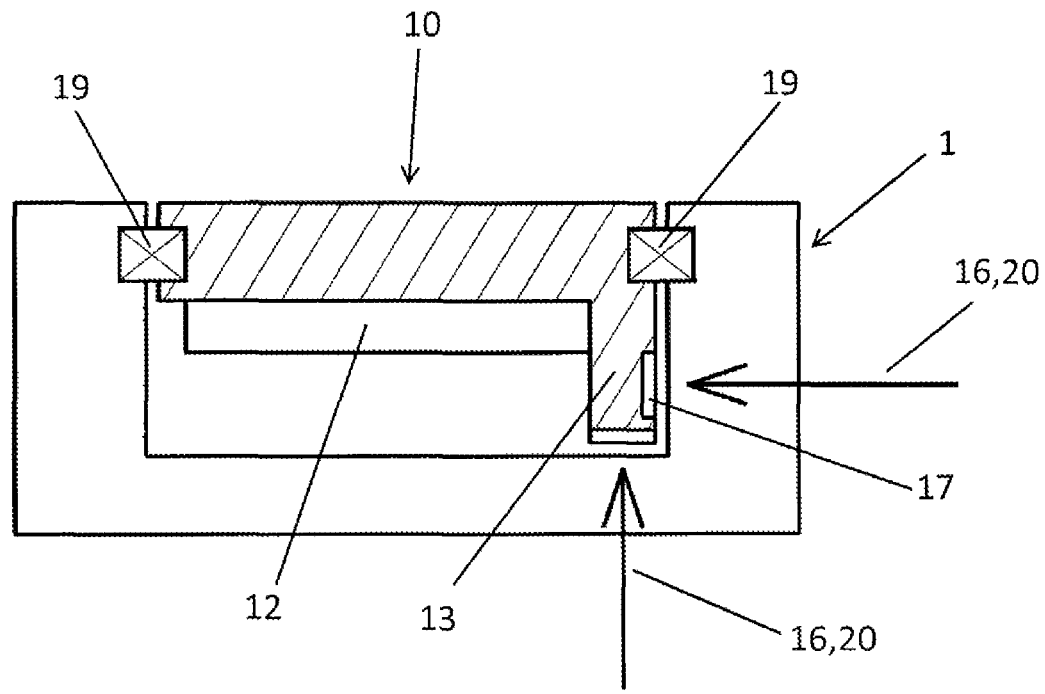
FIG. 4: shows a third embodiment altered in relation to FIG. 2.

FIG. 4 shows as an altered embodiment that the stop bolt 20 and the position sensor 16 can act on the same lateral leg 13 of the carriage, whereby the lateral leg 14 can be omitted and the entire profile of the carriage is only still implemented as an L-profile. The installation space 12 resulting in this way is then laterally open.

Figure 5:
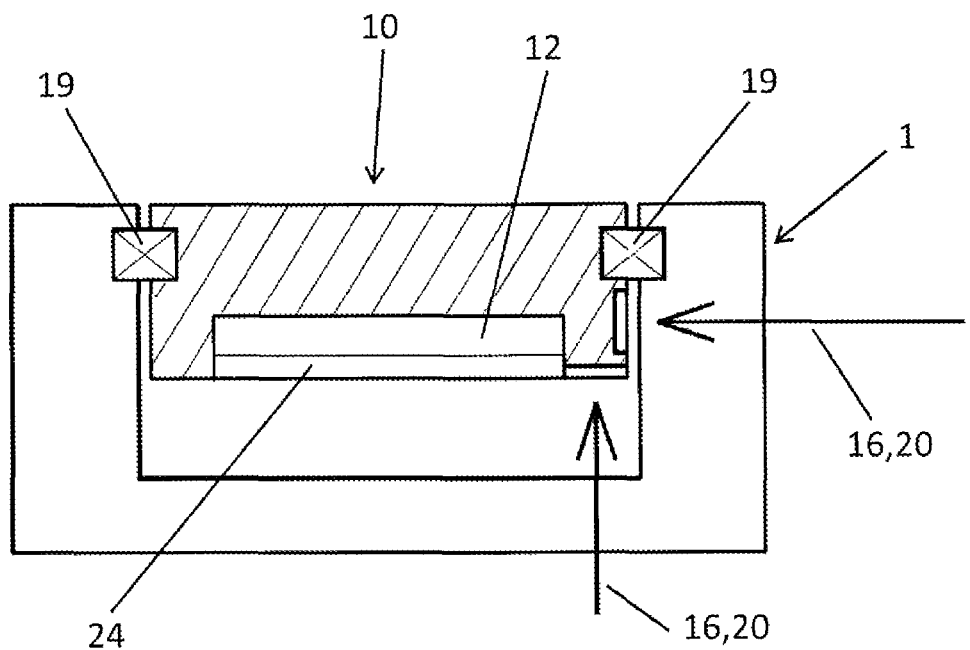
FIG. 5: shows a fourth embodiment altered in relation to FIG. 2.

FIG. 5 shows as a further exemplary embodiment that the profile of the carriage 10 can approximately correspond to a rectangular profile, wherein the installation space 12 in the interior of the rectangular profile is provided for the installation of the permanent magnets 24 and is covered on the bottom.

Furthermore, FIG. 5 shows that optionally either the position sensor or the stop bolt can be arranged on the right, or if the position sensor is arranged on the right, the stop bolt 20 is then arranged on the bottom or vice versa.

Figure 5A:
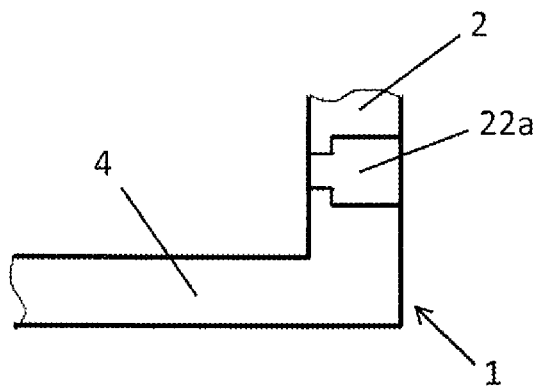
FIG. 5A: schematically shows a first possibility for housing a position sensor in the web of the stator housing.
Figure 5B:
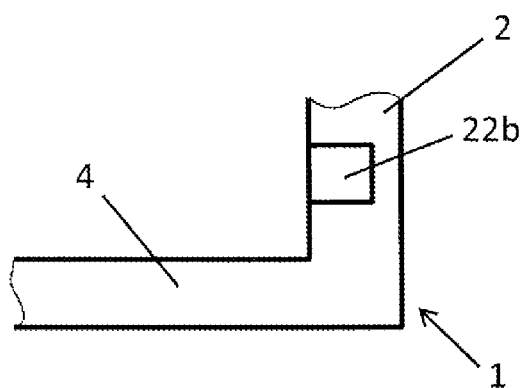
FIG. 5B: shows an embodiment altered in relation to FIG. 5A.
Figure 5C:
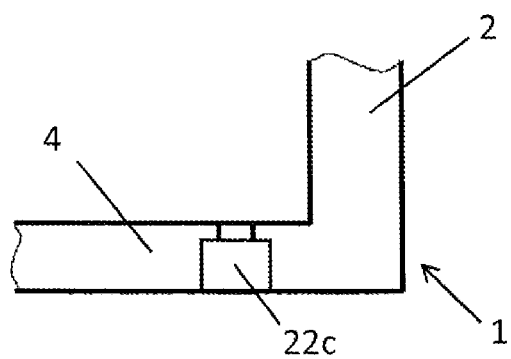
FIG. 5C: shows a second embodiment altered in relation to FIG. 5A.

FIGS. 5A to 5C show various installation possibilities for the installation of the position sensor 16, wherein the recesses 22, 22a, 22b, 22c can also be used for the installation of a stop bolt 20.

FIG. 5A shows that the web 2 is open from the outside, to form a recess 22a from the outside for the installation of the position sensor 16.

FIG. 5B shows that the recess 22b does not necessarily have to penetrate the web 2, but rather a pocket borehole or pocket opening can also be provided, in which the position sensor 16 (not shown in greater detail) is inserted.

FIG. 5C shows that a recess 22c is also provided in the bottom region, i.e., in the bottom web 4 of the stator housing, in which the position sensor 16 is installed.

Figure 6:
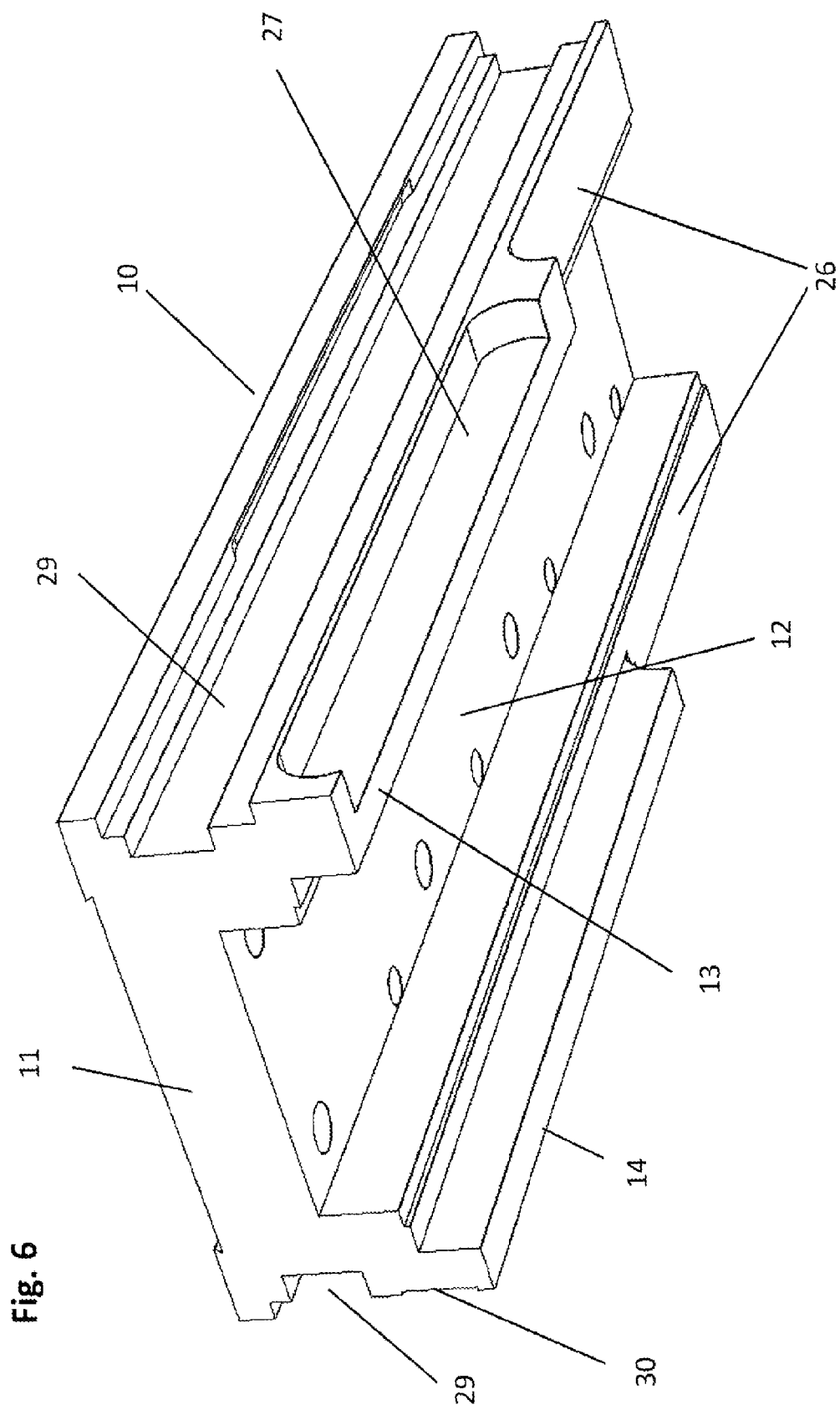
FIG. 6: shows a perspective illustration of a first embodiment of a carriage.

FIG. 6 shows a perspective illustration of a first embodiment of a carriage 10, as is schematically illustrated in the drawings according to FIGS. 1 and 2.

The carriage has two longitudinal grooves 29, which are located laterally and at the same height, on which a roller arrangement 19 engages, which is implemented in the exemplary embodiment shown as a roller cage 37, which is arranged so it is freely displaceable in the two longitudinal grooves 29, which are each opposite to one another.

Slide rods (not shown in greater detail), which form hardened running surfaces, are provided in the longitudinal grooves 29. The slide rods are illustrated in FIG. 8.

The stop bolt 20 engages in a longitudinal groove 27 and stops on the respective left-side and right-side delimitations of the longitudinal groove 27, to ensure a withdrawal delimitation for the carriage 10 toward both sides.

Precise reference points in the extended and retracted state of the carriage 10 are achieved by the stop surfaces on the ends of the longitudinal grooves 27.

Furthermore, the installation space 12 is recognizable on the bottom side. A longitudinal groove 30, which is covered by a cover plate 32, receives the length scale 17 (not shown).

The lateral webs 13, 14 do not extend over the entire length of the carriage 10, but have recesses 26 in each case on the ends. This means that the length of the lateral legs 13, 14 of the carriage 10 does not have to correspond to the total length of the carriage with the base leg 11.

Figure 7:
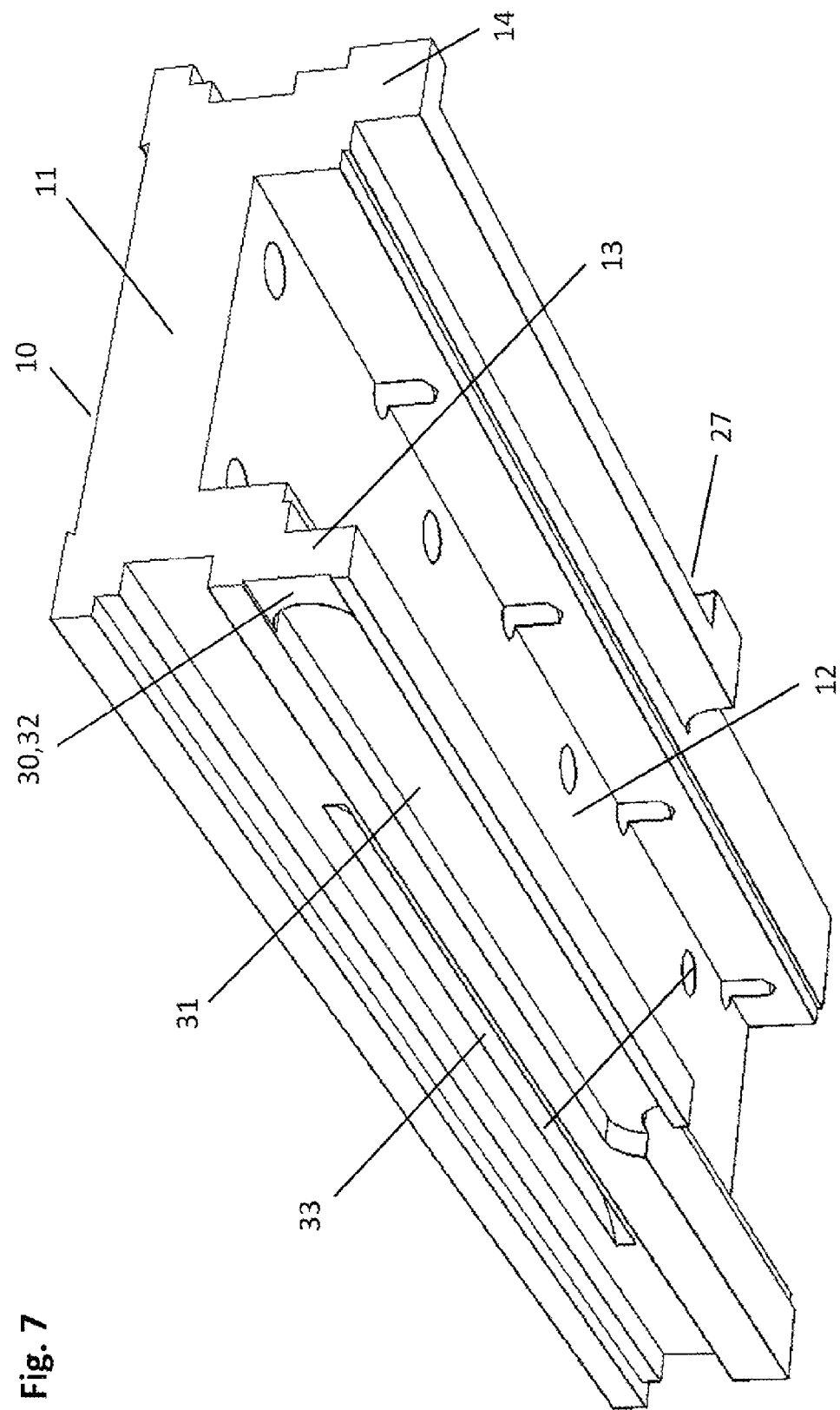
FIG. 7: shows a bottom view of the carriage.

FIG. 7 shows a bottom view of the carriage 10. The carriage is shown from the opposite side in comparison to FIG. 6.

A longitudinal groove 31 receives the length scale 17 and merges into a further longitudinal groove 30, which is covered by a cover plate 32. In this manner, the length scale 17 lies in the longitudinal groove 31 and is covered flush by the cover plate 32, which is fastened in the longitudinal groove 30.

The length scale 17 is glued over the entire length in the longitudinal groove 31.

A longitudinal groove 33 is provided laterally in each case for receiving a toothed rack (not shown in the drawing).

The toothed rack (not shown in greater detail) interacts with a gearwheel 39 arranged on each side in FIG. 10 in each case, which is connected so it is rotatable and centrally to the roller cage 37 and ensures prevention of the travel of the roller cage 37 during a plurality of displacement movements. It is therefore ensured that the roller cage 37 with the rollers 40 arranged axle-free therein remains in the middle region of the stator housing 1 on the roller arrangement.

Further details are illustrated in FIG. 8, where it is recognizable that the roller arrangement 19 interacts with slide rods, so that the rollers 40 arranged in the roller cage 37 roll on hardened running surfaces of slide rods which are diametrically opposite to one another, to thus achieve precise guiding of the carriage 10 in the arrow directions 38.

Furthermore, it can be inferred from FIG. 8 that the winding packet 7 engages in the installation space below the carriage 10 and implements a bottom-side, lower iron counter plate 34.

In contrast thereto, an iron counter plate 35 is provided in the installation space on the underside of the carriage 10, below which the permanent magnets are installed in the installation space 12.

The entire upper installation space on the underside of the carriage 10 is covered by a cover plate 36.

It is recognizable in FIG. 8 that the position sensor 16 is arranged in the region of the web 3 in a recess 22, which is covered from the outside by a plastic cover 46.

It is therefore clear from FIG. 8 that the position sensor 16 no longer occupies the installation space in the stator housing 1, but rather is displaced into the region of the web 3.

Figure 9:
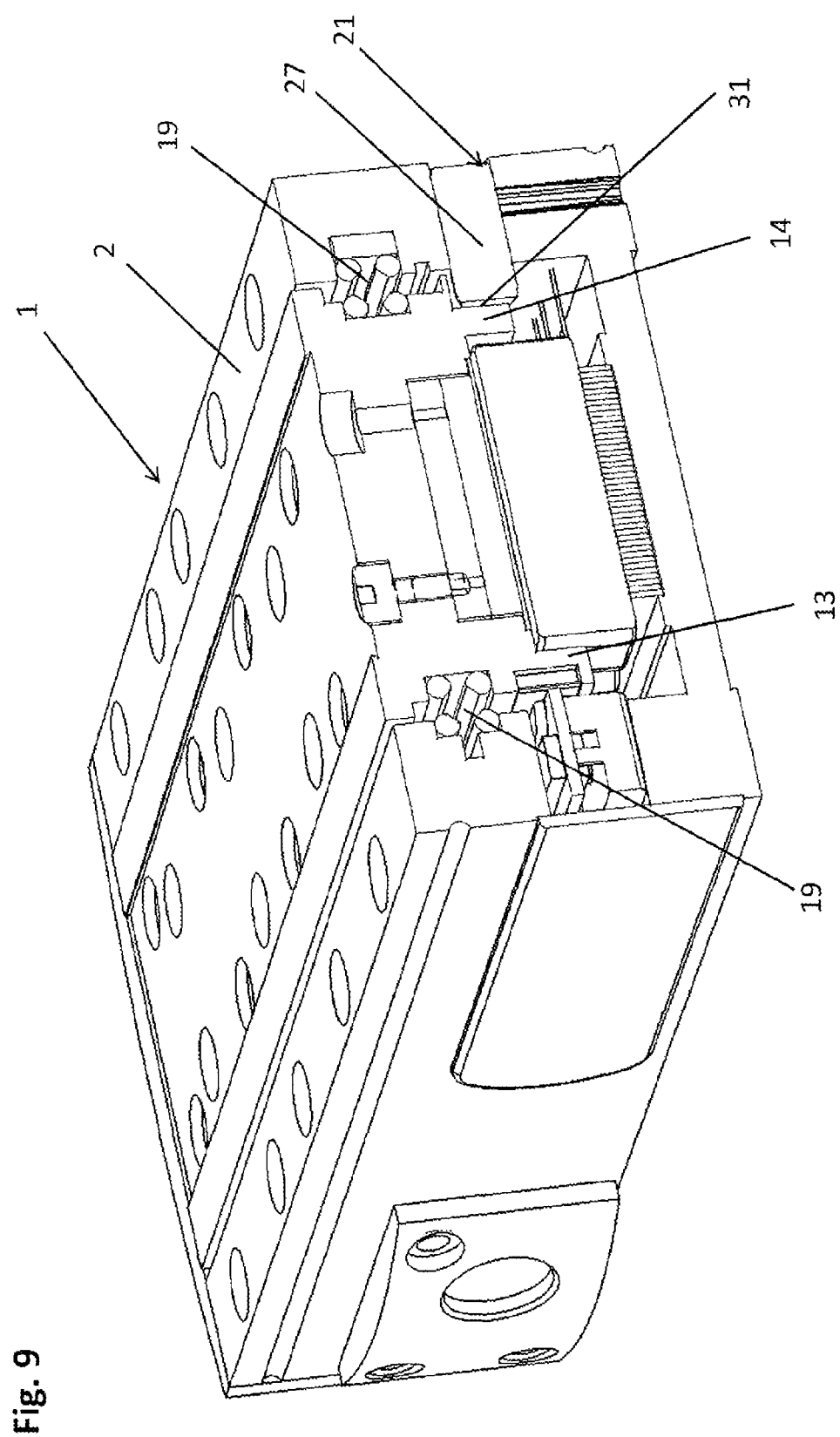
FIG. 9: shows a section through the carriage.

In comparison to FIG. 8, FIG. 9 shows a section through the carriage, wherein the same parts are provided with the same reference signs. It is recognizable therein that a stop bolt 20 is arranged in the region of the web 2 of the stator housing 1 in the region of the recess 21, and accordingly the stop bolt 20 for delimiting the longitudinal displacement of the carriage is also displaced into a web 2 of the stator housing 1.

The stop bolt 20 accordingly also no longer occupies the installation space 5 in the stator housing 1.

FIG. 10 shows the top view of the stator housing 1 in a view similar to FIG. 1. The lateral legs 13, 14 (not shown in greater detail) of the carriage 10 engage in associated recesses 34 in the inner region of the stator housing 1 and are longitudinally displaceable therein. They thus engage along the winding packet 7, which consists in the exemplary embodiment shown of a total of six coils joined to one another, the total area of which—which is now enlarged—is a measure of the superior power of the linear motor.

Accordingly, it results from FIG. 10 that the winding packet 7 fills up the entire width of the stator housing 1, but with the exception of the lateral recesses 44, which are provided for the engagement of the lateral legs 13, 14 of the carriage 10.

It was noted here in conjunction with FIG. 1 that the winding packet 7 can also extend at least partially under the lateral legs 13, 14. This was illustrated in FIG. 1 with the lateral edges 8' of the winding packet.

FIG. 10 furthermore shows the roller cage 37 having the rollers 40 mounted axle-free therein and a gearwheel 39 arranged in the middle region of the roller cage 37, which rolls on the stator-side toothed rack (not shown in greater detail).

The entire roller cage 37 can therefore be displaced in the longitudinal displacement direction and always remains approximately in the middle region of the stator housing 1 thanks to the gearwheel 39 and the toothed rack arranged on the stator side.

Coil wires 42 for the connection to the winding packet 7 are guided in the longitudinal space 41, which continues in alignment with the recess 44. The installation space below the lateral legs 13, 14 of the carriage in the stator housing 1 is therefore also used for laying coil wires 42.

The coil wires, which are combined as a whole to form wire bundles, and which are guided through the longitudinal space 41, are introduced joined together into a connection block 43 and connected to electronics (not shown in greater detail).

In FIG. 11, the roller arrangement only engages on top in the installation space 5, which consists in the exemplary embodiment of the two roller cages 37, which are parallel to one another and displaceable, wherein the one gearwheel 39 is seated in the horizontal plane and the opposing gearwheel 39 is seated on the respective stator-side toothed rack and rolls therein. The running properties of the roller cages are improved by the gearwheels oriented in two different planes.

DRAWING LEGEND 1 stator housing
2 web
3 web
4 bottom web
5 installation space
6 width (of 5)
7 winding packet
8 lateral edge 8'
9 lower edge
10 carriage
11 base leg
12 installation space (permanent magnets)
13 lateral leg
14 lateral leg
15 free space
16 position sensor
17 length scale
18 arrow direction
19 roller arrangement
20 stop bolt
21 recess (of 20)
22 recess (for 16)
23 longitudinal slot
24 permanent magnet
25 connecting leg
26 recess
27 longitudinal groove (for 20)
28 longitudinal groove
29 longitudinal groove (for 19)
30 longitudinal groove (for 32)
31 longitudinal groove (for 17)
32 cover plate
33 longitudinal groove (for toothed rack)
34 iron counter plate (of 7)
35 iron counter plate (of 12)
36 cover plate
37 roller cage
38 arrow direction
39 gearwheel
40 roller
41 longitudinal space
42 coil wires
43 connection block
44 recess
45 arrow direction
46 cover

The invention claimed is:

1. A linear motor, comprising:
a U-shaped profiled stator housing (1), which defines an inner installation space (5) for receiving a winding packet (7) consisting of multiple coils, the U-shaped profiled stator housing comprising a bottom web and two webs extending away from the bottom web and parallel to one another, each of the two webs having an inner surface facing each other, wherein the two webs (2, 3) of the stator housing (1) are connected material-integrally to the bottom web (4) so as to have a continuous integral U-shaped profile,
a carriage (10) engaging in and inserted between the two webs of the stator housing (1) so as to delimit sides of the inner installation space (5) between the inner surfaces of the two webs of the stator (1) and a cover over the inner installation space (5), said carriage being configured to be longitudinally displaceably driven by magnetic force on the stator housing (1), wherein the carriage (10) consists of two lateral legs (13, 14) and a base leg (11) which is connected material-integrally to the two lateral legs, the two lateral legs being parallel to one another so that the carriage has a continuous integral U-shaped profile and each having a free end opposite to the base leg,
a roller arrangement attached in an upper region of the two lateral legs of the carriage (10),
a first recess (22) defined in the inner surface of one of the two webs of the stator housing (1) outside of and opening inward toward the installation space for the winding packet (7),
a length scale (17) fastened on a lateral surface of the carriage in a position facing outwardly toward the one of the two webs of the stator housing opposing the first recess (22), the length scale having a longitudinal axis that is oriented vertically with respect to the base leg of the carriage,
a position sensor (16) having a longitudinal axis and arranged in the first recess with the longitudinal axis of the position sensor oriented horizontally with respect to the base web of the stator housing, and which therefore faces outward from the first recess (22) towards the installation space and the one of the two lateral legs of the carriage, the position sensor having a measurement surface oriented toward the length scale (17) arranged on the lateral surface of the carriage,
wherein the length scale is disposed on one of the two lateral legs of the carriage between the roller arrangement and the free end of the one of the two lateral legs, in the region of the free end of one of the lateral legs and below the roller arrangement in the vertical direction and faces outwardly toward the one of the two webs in which the position scale is disposed,
wherein the inner installation space in which the winding packet (7) is arranged in the stator housing (1) is uninfluenced by the position sensor (16) also arranged in the stator housing (1) outside the installation space for the winding packet.

2. The linear motor according to claim 1, wherein the carriage (10) driven so the carriage is displaceable by magnetic force, and comprises two lateral legs (13, 14) and a base leg (11) so as to have a U-shaped in cross section, and wherein the length scale (17) associated with the position sensor (16) is arranged on one of the lateral legs (13).

3. The linear motor according to claim 1, wherein the carriage (10) driven so the carriage is displaceable by magnetic force, and the carriage (10) comprises two lateral legs (13) and a base leg (11) so as to have a U-shaped in cross section, and wherein the length scale (17) is fastened on or in one of the lateral legs (13) of the carriage (10), and a longitudinal groove (27, 28) is arranged in one of the lateral legs (13) with formation of stop surfaces for a stop bolt (20) arranged on the stator side for the delimitation of the displacement of the carriage (10) in the stator housing (1).

4. The linear motor according to claim 1, wherein the cross section of the carriage (10) is L-shaped.

5. The linear motor according to claim 1, wherein the cross section of the carriage (10) is rectangular and an installation space for the permanent magnet arrangement is only provided in the middle region, which is covered on the bottom by a cover plate.

6. The linear motor according to claim 1, wherein the carriage (10) engages the stator housing with said lateral legs (13, 14) in the inner installation space (5), and lateral edges (8) of the winding packet (7) extend up to the inner delimitation of the lateral legs (13, 14) of the carriage (10).

7. The linear motor according to claim 1, wherein the carriage (10) engages the stator housing with said lateral legs (13, 14) in the installation space (5) of the stator housing (1), and lateral edges (8') of the winding packet (7) extend down to below the lateral legs (13, 14) of the carriage (10).

8. The linear motor according to claim 1, wherein the first recess is a through-hole passing through the one of the two webs of the stator housing (1).

* * * * *